United States Patent
Wittkopp

(10) Patent No.: US 7,111,833 B2
(45) Date of Patent: Sep. 26, 2006

(54) DUAL DISC SPRING

(75) Inventor: Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/242,541

(22) Filed: Oct. 3, 2005

(65) Prior Publication Data
US 2006/0071382 A1 Apr. 6, 2006

Related U.S. Application Data

(63) Continuation of application No. 10/951,487, filed on Sep. 28, 2004, now abandoned.

(51) Int. Cl.
*F16F 1/18* (2006.01)

(52) U.S. Cl. .................. 267/160; 267/158; 192/70.17

(58) Field of Classification Search ............... 192/3.21, 192/3.25, 70.16, 70.17, 89.1; 188/73.36, 188/73.38; 267/158, 160
See application file for complete search history.

(56) References Cited

U.S. PATENT DOCUMENTS

| 1,176,632 A | 3/1916 | Werner ...................... 310/232 |
| 1,850,566 A | 3/1932 | Thorvald .................... 277/555 |
| 2,229,319 A | 1/1941 | Wesselhoff ............. 192/70.17 |
| 3,107,766 A | 10/1963 | Pritchard ................... 192/89.1 |
| 3,483,888 A | 12/1969 | Wurzel ........................ 137/539 |
| 3,951,393 A | 4/1976 | Smirl ......................... 267/161 |
| 4,135,283 A | 1/1979 | Kohlhage .................. 148/580 |
| 4,538,716 A | 9/1985 | Reik ....................... 192/70.29 |

*Primary Examiner*—Chris P. Schwartz
(74) *Attorney, Agent, or Firm*—Christopher DeVries

(57) ABSTRACT

A dual spring includes a pair of conically-shaped spring sections, which are joined at a common fulcrum. One of the spring sections is disposed radially inward from the fulcrum and the other of the spring sections is disposed radially outward from the fulcrum. Both of the conical sections open axially in the same direction relative to the fulcrum section.

3 Claims, 2 Drawing Sheets

DUAL DISC SPRING

This is a continuation of application Ser. No. 10/951,487 filed on Sep. 28, 2004 now abandoned.

TECHNICAL FIELD

This invention relates to springs and, more particularly, to disc-type or washer-type springs.

BACKGROUND OF THE INVENTION

Washer or Belleville springs, as they are commonly termed, employ a conical-shaped washer or disc, which has spring properties. The disc spring is deflected from the conical shape towards a flat shape as reaction load increases. A typical disc spring has advantages over coiled wire springs in that less axial space is needed for a given reaction load requirement. Also, the disc spring can be designed to have a constant load over a wide range of deflections. This makes this spring very useful in environments, such as torque-transmitting mechanisms, where it is desirable to provide control over the reaction force on the apply piston which is returning the piston to a disengaged condition in a torque-transmitting mechanism.

SUMMARY OF THE INVENTION

It is an object of the present invention to provide an improved disc-type spring member.

In one aspect of the present invention, the disc spring has two spring sections, which are joined at a common fulcrum.

In another aspect of the present invention, the spring sections are both conical in shape.

In still another aspect of the present invention, the disc spring sections extend axially in the same direction.

In yet still another aspect of the present invention, one of the spring sections has a castellated profile.

In a further aspect of the present invention, the dual disc spring is employed in a dual piston torque-transmitting mechanism assembly.

DESCRIPTION OF AN EXEMPLARY EMBODIMENT

Figure 1:
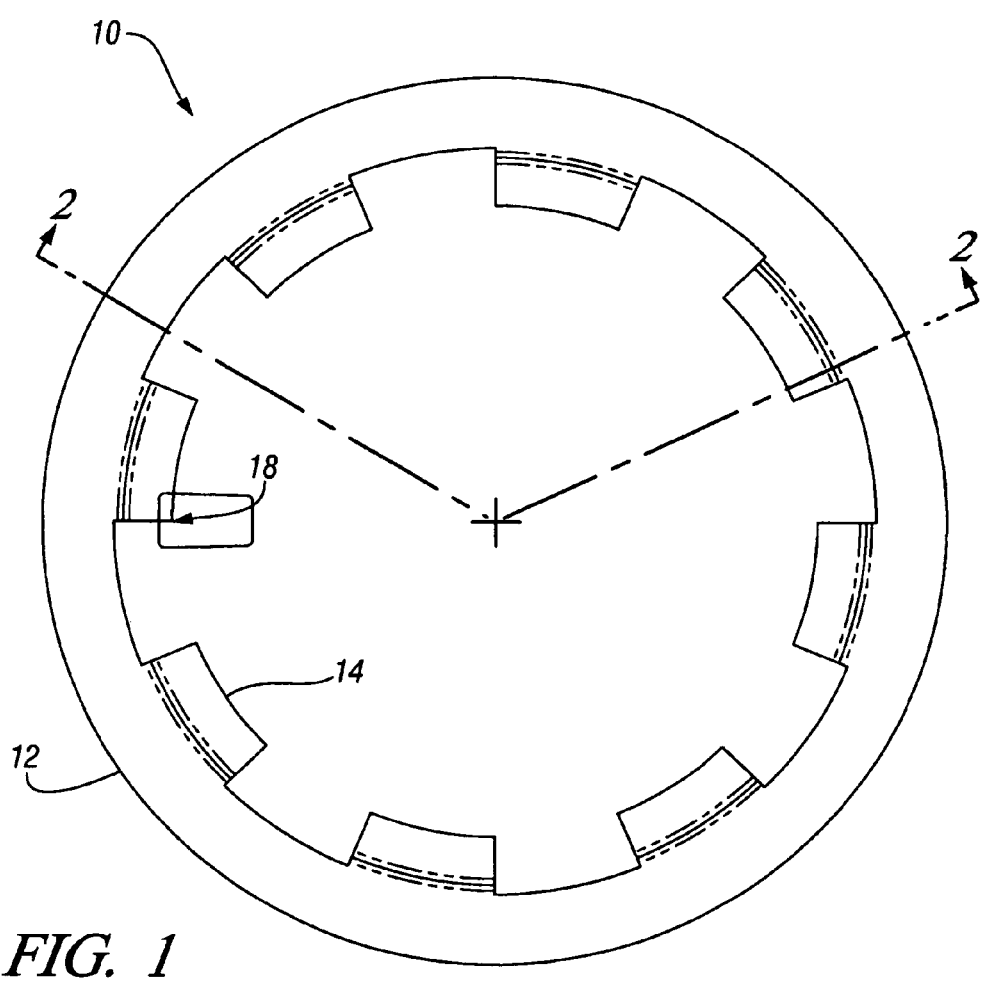
FIG. 1 is a plan view of a disc spring incorporating the present invention.
Figure 2:
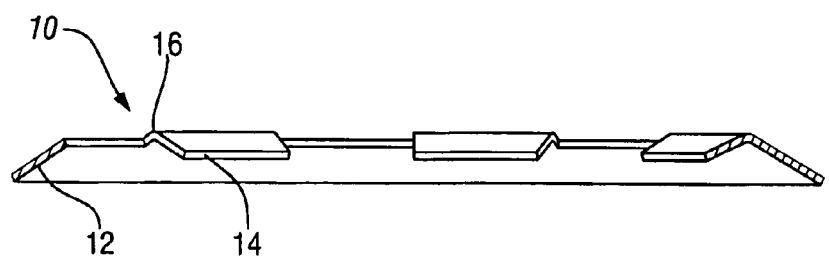
FIG. 2 is a view taken along line 2—2 in FIG. 1.

Referring to the drawings, wherein like characters represent the same or corresponding parts throughout the several views, there is seen in FIG. 1 a dual disc spring 10 having an outer disc section 12, an inner disc section 14, and a fulcrum point 16. The disc sections 12 and 14 are both conically shaped, as that seen in FIG. 2. The conical displacement from the fulcrum 16 is in the same axial direction and opposite radial directions.

The inner disc 14 has a castellated profile 18. The castellated profile could be placed in the outer disc section 12 wherein the inner disc section would then be a continuous disc or conical section. Each of the inner disc and outer disc portions will provide a reaction for loads when the fulcrum 16 is positioned in a stationary location and a load is applied through the respective disc portions.

Figure 3:
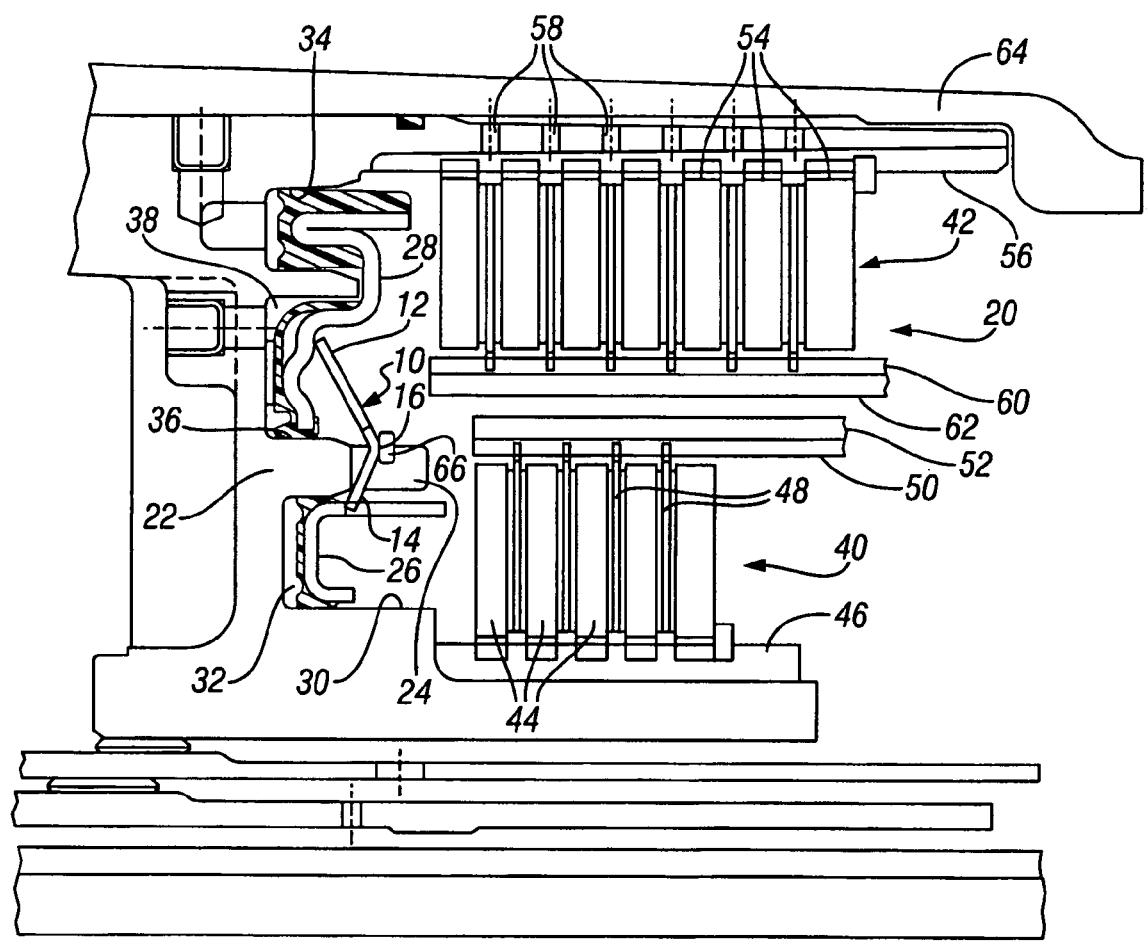
FIG. 3 is an elevational view of a portion of a transmission incorporating the present invention.

A dual torque-transmitting arrangement 20 is shown in FIG. 3. This dual torque-transmitting arrangement 20 includes the dual disc spring 10 disposed on a stationary housing 22. The stationary housing 22 has a plurality of protuberances or fingers 24 over which the castellated profile of inner disc 14 is disposed. The torque-transmitting arrangement 20 also includes a pair of apply pistons 26 and 28. The apply piston 26 is slidably disposed in a cavity 30 and cooperates therewith to form an apply chamber 32. The apply piston 28 is slidably disposed in a pair of cavities 34 and 36 and cooperates with these cavities to form an apply chamber 38.

The torque-transmitting arrangement 20 has an inner torque-transmitting mechanism 40 and an outer torque-transmitting mechanism 42. The inner torque-transmitting mechanism 40 has a plurality of friction members 44 that are drivingly connected with and slidably disposed on a spline 46 formed in the housing 22. The torque-transmitting mechanism 40 also includes a second plurality of friction members 48, which are drivingly connected to and slidably disposed on a spline 50 formed on a hub member 52. The hub member 52 is connectible with a gearing member within a power transmission, not shown.

The torque-transmitting mechanism 42 includes a plurality of friction members 54 drivingly connected with and slidably disposed on a spline 56 formed on the housing 22. A second plurality of friction members 58 are slidably disposed on and drivingly connected with a spline 60 formed on a hub 62, which is also adapted to be connected with a planetary gear member, not shown. The housing 22 is secured in a transmission housing 64, such that all the components connected therewith are stationary. The torque-transmitting mechanisms 40 and 42 are therefore stationary type torque-transmitting mechanisms in this application. These stationary type torque-transmitting mechanisms are commonly termed brakes or reaction clutches.

The chambers 32 and 38 are in fluid communication with an axial hydraulic control system, not shown. When desirable to engage either of the torque-transmitting mechanisms 40 or 42, the respective chambers 32 and 38 are pressurized with a fluid pressure sufficient to overcome the reaction force in the disc portions 14 and 12. When the chamber 32 is pressurized, the piston 26 will move axially rightward to engage one of the friction members 44, which will result in a frictional drive connection between the housing 22 and the hub 52 thereby retaining the planetary member connected therewith stationary. As the piston 26 is moved axially rightward, the load within the inner disc spring 14 reacts at the fulcrum point 16, which is positioned stationary within the housing 22 by a conventional locking ring 66.

When the chamber 38 is pressurized, the piston 28 will move axially rightward against the reaction force in the disc spring 12 to engage one of the friction members 54, which frictionally engages the friction members 58 to complete a torque-transmitting connection between the hub 62 and the housing 22. Thus, at this point, the planetary member connected with the hub 62 will be held stationary.

When the piston 26 moves rightward, the force on disc spring 14 will be reacted at the outer end of disc spring 12, and when the piston 28 is moved axially, the force on disc spring 12 will be reacted at the radially inner end of disc spring 14. It is not recommended in certain systems to actuate the pistons 26 and 28 simultaneously. The actuation of the piston 26, for example, changes the reaction force available at the disc spring 12 and the operation of piston 28 changes the reaction force available at the disc spring 14. When the piston 26 is actuated, the pressure necessary to actuate the piston 28 will be greater and when the piston 28 is actuated, the pressure necessary to actuate the piston 26 will be greater. In many systems, this will be of little consequence since the control pressure available is significantly greater than the maximum pressure needed to fully engage or energize the torque-transmitting mechanisms 40 and 42.

Obviously, those skilled in the art will find modifications and variations of the above-described disclosure. Therefore, it is to be understood that the scope of the present invention is limited only by the appended claims.

The invention claimed is:

1. A dual torque transmitting mechanism with a dual acting spring comprising:
    a first piston member;
    a second piston member;
    a first conical spring section;
    a second conical spring section;
    a fulcrum section joining said first and second conical spring sections;
    means for positioning said fulcrum section at a stationary position; and
    said first conical spring section extending outward from said fulcrum section to engage said first piston member and said second conical spring section extending inward from said fulcrum section to engage said second piston member.

2. The dual torque transmitting mechanism with a dual acting spring defined in claim 1 further comprising:
    one of said conical spring sections having a plurality of castellations.

3. The dual torque transmitting mechanism with a dual acting spring defined in claim 1 further wherein:
    both of said first conical spring section and said second conical spring section opens in the same axial direction relative to said fulcrum section.

* * * * *